Jan. 23, 1951 G. J. ABBOTT 2,539,002
MACHINE FOR CUTTING POTATOES OR OTHER OBJECTS
INTO CHIPS OR SLICES
Filed Aug. 1, 1947 2 Sheets-Sheet 1
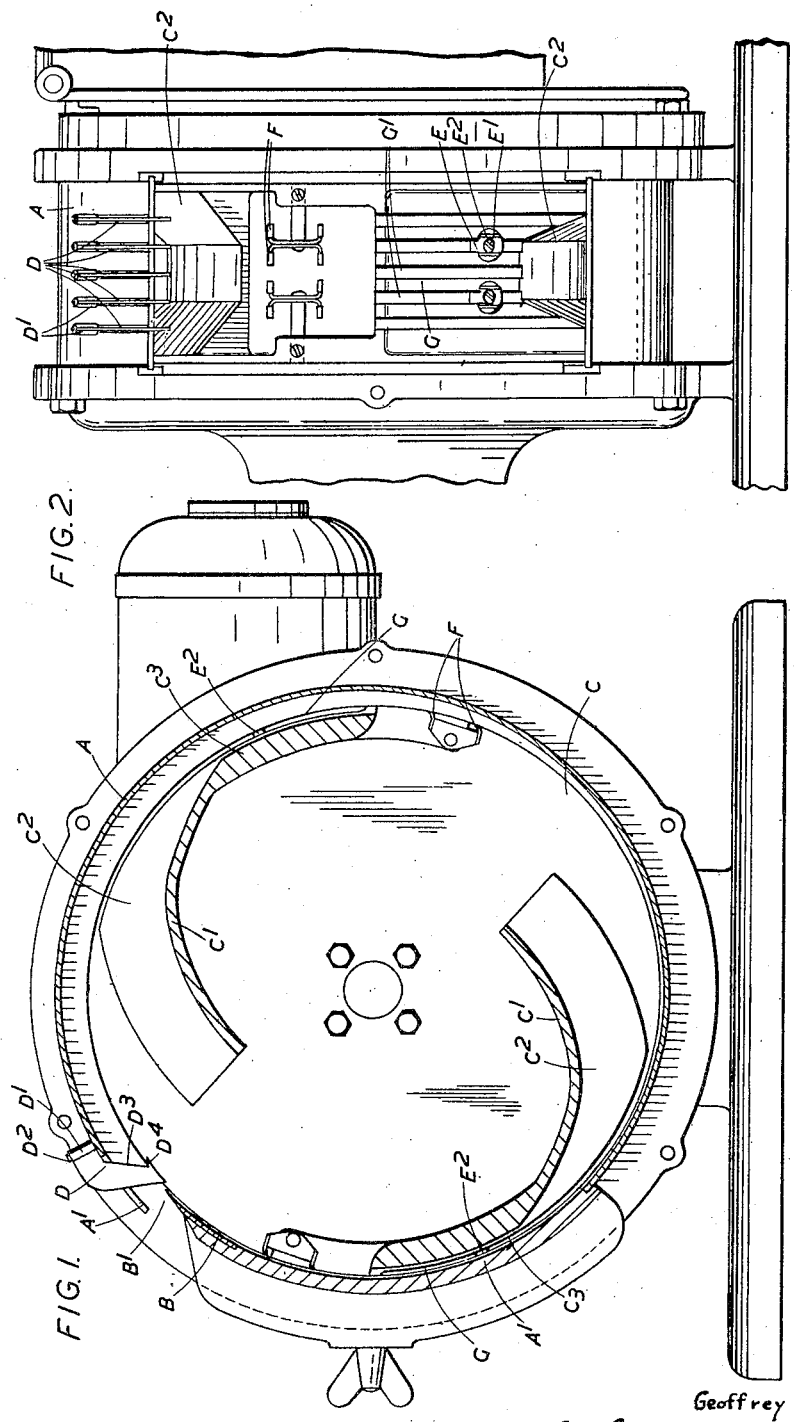
Inventor
Geoffrey J. Abbott
By: Emery, Holcombe & Blair
Attorney Jan. 23, 1951 G. J. ABBOTT 2,539,002
MACHINE FOR CUTTING POTATOES OR OTHER OBJECTS
INTO CHIPS OR SLICES
Filed Aug. 1, 1947 2 Sheets-Sheet 2

Inventor

Geoffrey J. Abbott
By Emery, Holcombe & Blair
Attorney

Patented Jan. 23, 1951

2,539,002

UNITED STATES PATENT OFFICE 2,539,002

MACHINE FOR CUTTING POTATOES OR OTHER OBJECTS INTO CHIPS OR SLICES

Geoffrey Joseph Abbott, Carshalton, England

Application August 1, 1947, Serial No. 765,353
In Great Britain August 9, 1946

7 Claims. (Cl. 146—78)

This invention relates to machines for cutting potatoes or other objects (hereinafter called potatoes) into "chips" or slices, of the kind in which the potato, or the part thereof to be sliced, is passed between a number of substantially parallel slitting blades, which thus slit it longitudinally. For the sake of convenience, such machines will be referred to as slicing machines.

The invention is particularly, but not exclusively, applicable to machines of this kind as described in U. S. patent specification No. 2,004,548, and will therefore be more particularly described with reference thereto although applicable to other machines of the general kind referred to.

In slicing machines of the kind referred to as at present made, the strip of potato which enters the space between the leading edges of any two slitting blades tends to force these leading edges apart, with the result that the leading edges tend to splay out and thus to travel diagonally through the potato and take in between them an even wider strip of potato. The result is that the strip of potato passing between the blades tends to become wedge-shaped and highly compressed, which not only damages the potato by crushing but results in considerable resistance to the passage of the potato between the blades. Moreover, if the blades are stiffened by thickening so as to reduce the tendency for the leading edges to splay out, the initial compression of the potato as it enters between their leading edge is increased, while if on the other hand the blades are made thinner to reduce the initial compression of the potato between their leading edges, the more readily do they splay out and thus try to force a wider and wider piece of potato between them.

The principal object of the present invention is to reduce or overcome this difficulty and thus reduce the effort necessary to force the potato through the slitting blades and also the tendency to crush the potato, so that the quality of the chips or slices produced is improved.

To this end in a slicing machine of the kind referred to according to the present invention, the slitting blades are independently pivoted so that each blade is free to take up automatically a position in which lateral forces thereon are approximately balanced. Thus, conveniently the blades are pivoted about axes adjacent to their front ends and preferably slightly in advance of their front ends, that is to say, the ends from which the potato approaches them. Further, while the cutting edge of each blade will usually lie in the same plane as its pivotal axis, it is preferably inclined to the pivotal axis so as to have a progressive slicing action.

In any case, it will be seen that with the arrangement according to the invention any tendency for the strip of potato passing between the leading edges of any two blades to force such blades apart, will be free to rock the blades about their pivots so that the blades become slightly inclined to one another with their leading edges closer together than their trailing edges. This tends to cause the direction of cutting of the blades to incline towards one another through the potato. Thus, any tendency for the leading edges of the blades to splay out so as to cut a wider and wider strip is automatically counterbalanced, since any separation of the blades moves them so that they tend to cut a narrower strip and a balance is thus obtained.

It will usually be preferable to provide means for restricting the free pivotal movement of the blades to substantially that required to enable them to adjust themselves automatically to the required extent about their pivots during the slitting operation. Thus during periods between successive slitting operations when the blades are free, they cannot move to any substantial extent outside their normal range of movement and are thus maintained reasonably near to their correct positions for the next slitting operation. For example in one convenient arrangement the blades may be carried by pivots projecting from one side of a plate or casing and extend from such pivots through slots in the plate or casing situated behind the pivots and having widths such that they limit the free pivotal movements of the blades to the required extent.

The invention may be carried into practice in various ways, but is conveniently applied to a machine of the general character described in the specification of U. S. Patent No. 2,004,548 and one construction according to the invention as applied to such a machine and incorporating also the subject matter of co-pending United States patent application No. 765,354, which became Patent No. 2,485,344 on October 18, 1949, is illustrated by way of example in the accompanying drawings in which:

Figure 1 is a sectional end elevation,

Figure 2 is a side view with certain parts omitted and with a cover plate removed to show certain details of the interior of the machine.

Figure 3:
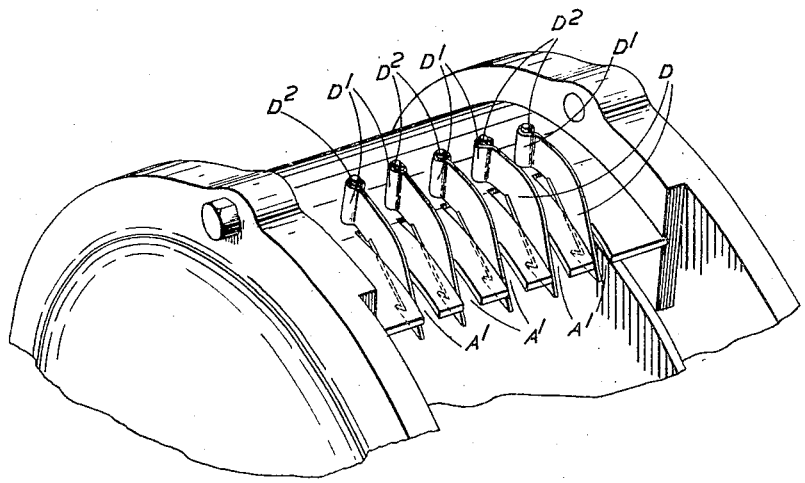
Figure 3 is an enlarged perspective view showing the form and arrangement of the slitting knives.
Figure 4:
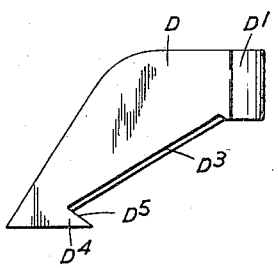
Figures 4 and 5 are respectively a side view and a plan view of a slitting knife on an enlarged scale.
Figure 5:

In the construction illustrated, the machine comprises a generally cylindrical casing having a circumferential wall A, the inner surface of which is of involute form as indicated. The inner end portion of the involute circumferential wall of the casing is formed as a detachable cover plate indicated at $A^1$ in Figure 1 and detailed in Figures 2 and 3, carrying a slicing knife B which constitutes the inner end of the involute wall and the inner edge of a discharge slot $B^1$ through which the slices of potato are ejected.

Arranged within the casing is a rotor C formed as a disc having formed or carried thereon two members $C^1$ which with the circumferential wall A, form throats $C^2$, each extending in a circumferential direction and having a diminishing cross-section from its outer or open end towards its inner end.

Each of these throats terminates at its narrow end in a part $C^3$ which if the wall A were cylindrical, would be of substantially constant cross-section, these parts being hereinafter called the tails of the throats, into which therefore will normally travel the last piece of any potato after the remainder has been sliced therefrom by the slicing knife B due to rotation of the rotor.

The general arrangement and functioning of the machine will not be further described since this is known and will be clear from U. S. Patent No. 2,004,548.

In the particular example of the machine according to the present invention shown in the drawings, a series of slitting blades D are provided immediately in front of the slicing knife B, each slitting blade being of the form shown and having its outer end formed as a socket $D^1$ and pivoted on a radial pivot pin $D^2$ while its inner end extends through a slot $A^1$ in the circumferential wall A to a point where it will lie in the path of a potato in either of the throats $C^2$.

The cutting edge $D^3$ of each slitting blade is inclined to the radial direction as shown and terminates at its inner end at a forward projection $D^4$ having an inclined unsharpened upper surface $D^5$.

The width of the slots $A^1$ is sufficient to permit free pivotal movement of the blades D within the required limits while limiting their pivotal movement when they are free. It will be seen that as each potato is picked up by one of the throats $C^1$, $C^2$ and carried round and through the blades D it will be slit by these blades and the slit part sliced off by the slicing knife B to form a series of chips which are ejected through the slot $B^1$.

The last piece of any potato left in a throat $C^3$ may vary considerably in radial thickness and in order to deal with these last pieces of potato a series of piercing members E are positioned in the tail of each throat so as to pass between the slitting blades D and are formed so as to pierce and attach the piece of potato to the rotor. In the construction shown these piercing members are in the form of plates secured to the rotor by screws $E^1$ and having upturned ends $E^2$ as described more fully in the specification of co-pending United States patent application No. 765,354, which became Patent No. 2,485,344 on October 18, 1949. Thus these piercing members are so dimensioned that when a piece of potato implated upon them meets the resistance of the slitting blades D the piercing members pass through the potato leaving it impaled upon the slitting blades. The piece of potato is then caught and forced through the slitting blades by claw members F constituted by plates having their outer edges facing forwardly and lying in planes at right-angles to their direction of movement as also described more fully in United States patent application No. 765,354, which became Patent No. 2,485,344 on October 18, 1949.

Between the piercing members E and the claw members F there is arranged on the periphery of the rotor a ridge shaped member G projecting radially and extending radially so that its outer periphery just clear the slicing knife B while the gaps $G^1$ between the ridges allow the ridge member to pass the slitting knives D. The function of the member G is to engage those pieces of potato which are just too large to be ejected through the discharge slot by the action of the throat. Thus the member G first forces these pieces past the slitting knives against which the pieces have been brought by the piercing members E and a final shaving is then caused to be removed by the slicing knife B. Thus in this way the ridge member G functions before and instead of the claw members F for any pieces of potato large enough to be dealt with by the member G.

It is to be understood that the arrangement more particularly described is given by way of example only and that details of construction may be modified considerably. For example the slitting blades may be arranged in staggered relationship or a rake member similar to that described in United States Patent No. 2,004,548 may be employed to deal with the last pieces of each potato.

What I claim as my invention and desire to secure by Letters Patent is:

1. A machine for slicing potatoes and like articles including in combination a blade-carrying plate, a plurality of slitting blades mounted side by side thereon and projecting perpendicularly therefrom and having cutting edges disposed at an angle relative thereto, a potato-carrying part movable relative to said blade-carrying plate and adapted to force a potato or the like carried by said potato-carrying part through said slitting blades, wherein the slitting blades are independently pivoted about pivot members perpendicular to said blade-carrying plate, located outside the potato contacting area of said slitting blades, and nearer the cutting than the rear edges thereof by a distance substantially equal to the width of said potato-contacting area, so that each blade can take up automatically during each slitting operation a position in which the lateral forces bearing against its sides are approximately balanced.

2. A machine for slicing potatoes and like articles including in combination an arcuate blade-carrying plate, a plurality of slitting blades mounted side by side thereon and projecting radially therefrom and having cutting edges disposed at an angle relative thereto, a potato-carrying part movable relative to said blade-carrying plate and adapted to force a potato or the like carried by said potato-carrying part through said slitting blades, wherein the slitting blades are independently pivoted about pivot members positioned radially of said blade-carrying plate and located outside the potato-contacting area of said slitting blades and nearer the cutting than the opposite edges thereof by a distance substantially equal to the width of said potato-contacting area, so that each blade can take up automatically during each slitting operation a position in which the lateral forces bearing against its sides are approximately balanced.

3. A slicing machine as claimed in claim 1 in which the cutting edge of each slitting blade is inclined relative to its pivotal axis and terminates at the end away from the blade-carrying plate in an unsharpened protuberance lying in the plane of the slitting blade and projecting forwardly from the cutting edge thereof.

4. A slicing machine as claimed in claim 2 in which the slitting blades project inwardly from said blade-carrying plate and said potato carrying part rotates within said arcuate blade-carrying plate.

5. A slicing machine as claimed in claim 2 in which said pivot members project from the blade-carrying plate on the side thereof remote from the potato-carryng part and the slitting blades project through slots in the blade-carrying part.

6. A slicing machine as claimed in claim 1 in which the blades are carried by pivots projecting from the blade-carrying part on the side thereof remote from the potato-carrying part and project through slots in the blade-carrying part.

7. In a slicing machine including in combination a stationary casing having a fixed circumferential wall provided with a discharge slot, a slicing knife carried by the circumferential wall adjacent to and in advance of the discharge slot, a plurality of slitting blades projecting through slots in the circumferential wall in advance of the knife, and a rotor within the casing having at least one tapering throat part of the wall of which is constituted by the circumferential wall of the casing, the throat being adapted to scoop up potatoes in the casing and force it while in close contact with the circumferential wall of the casing through the slitting blades and past the slicing knife, a slitting blade mounting comprising radial pivots carried by the circumferential wall in advance of the slots and supporting the outer ends of the slitting blades so that said blades are free to rock independently about radial axes.

GEOFFREY JOSEPH ABBOTT.

REFERENCES CITED

The following references are of record in the file of this patent:

UNITED STATES PATENTS

| Number | Name | Date |
|---|---|---|
| 466,453 | Burns | Jan. 5, 1892 |
| 1,365,328 | Krotzer | Jan. 11, 1921 |
| 1,775,813 | Colby | Sept. 16, 1930 |
| 1,993,197 | Urschel | Mar. 5, 1935 |
| 2,004,548 | Abbott | June 11, 1935 |
| 2,293,141 | John | Aug. 18, 1942 |